United States Patent [19]

Sigur

[11] Patent Number: 5,084,219
[45] Date of Patent: Jan. 28, 1992

[54] METHOD OF FABRICATING COMPOSITE STRUCTURES

[75] Inventor: Wanda A. Sigur, New Orleans, La.

[73] Assignee: The United States of America as represented by the Administrator of the National Aeronautics and Space Administration, Washington, D.C.

[21] Appl. No.: 578,043

[22] Filed: Sep. 5, 1990

[51] Int. Cl.⁵ .................... B29C 43/20; B29C 43/52
[52] U.S. Cl. ...................... 264/25; 264/258; 264/313; 264/324; 156/173; 156/187
[58] Field of Search ............ 264/22, 313, 25, 257, 264/258, 319, 320, 324, 325; 249/134, 135; 156/172, 173, 184, 185, 186, 187, 188

[56] References Cited

U.S. PATENT DOCUMENTS

| | | | |
|---|---|---|---|
| 3,165,569 | 1/1965 | Bright | 264/319 |
| 4,673,541 | 6/1987 | Watanabe | 264/25 |
| 4,851,280 | 7/1989 | Gupta | 156/285 |

Primary Examiner—Jay H. Woo
Assistant Examiner—Jeremiah F. Durkin, II
Attorney, Agent, or Firm—Robert L. Broad, Jr.; Jerry L. Seemann; Harold W. Adams

[57] ABSTRACT

A method of fabricating structures formed from composite materials by positioning the structure about a high coefficient of thermal expansion material, wrapping a graphite fiber overwrap about the structure, and thereafter heating the assembly to expand the high coefficient of thermal expansion material to forcibly compress the composite structure against the restraint provided by the graphite overwrap. The high coefficient of thermal expansion material is disposed about a mandrel with a release system therebetween, and with a release system between the material having the high coefficient of thermal expansion and the composite material, and between the graphite fibers and the composite structure. The heating may occur by inducing heat into the assembly by a magnetic field created by coils disposed about the assembly through which alternating current flows. The method permits structures to be formed without the use of an autoclave.

8 Claims, 1 Drawing Sheet

METHOD OF FABRICATING COMPOSITE STRUCTURES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention relates to the fabrication of composite structures and more particularly to the fabrication of high strength-low weight laminated structures of substantially unlimited size without the use of high cost autoclaves by the application of internal pressure to the structure while providing an external pressure restraint on the structure.

It has been demonstrated that significant weight and cost savings can be attained over aluminum and steel alloys in structures incorporating advanced composite materials. Fifteen to forty percent savings have been generated in various aircraft and aerospace components. Five to twenty five percent cost savings have been recorded in production programs. These benefits are attributed to high strength, high stiffness fibers in a low density matrix, both metallic and non-metallic, which can be oriented to address maximum load conditions. For example, high strength composite structures having graphite fibers embedded in an epoxy matrix have approximately nine times the specific strength of stainless steel and three and one-half times that of aluminum alloys, and have specific moduli which are approximately 22 times and 3.2 times that of stainless steel and aluminum alloys respectively. High modulus types of graphite/epoxy composites are in the order of seven and one-half and two and one-half times the specific strength of stainless steel and aluminum alloys respectively, and have a specific modulus which is in the order of approximately thirty and four and one-half times that of stainless steel and aluminum alloys respectively. A composite made up of fibers of a polyaramide sold under the registered trademark KEVLAR and an epoxy matrix has a specific strength of approximately eleven times that of stainless steel and 3.75 times that of aluminum, while the specific modulus is in the order of approximately fifteen and two times that of these respective metals.

Difficulties in processing the matrix material has been experienced due to the required application of temperature and pressure. The processing or fabrication of these materials is typically conducted in an autoclave allowing the simultaneous application of pressure and temperature. Autoclaves, unfortunately, are extremely costly to build, and only small autoclaves have been constructed. An autoclave of sufficient size to fabricate a typical boost vehicle of approximately 30 feet in diameter has never been made because the cost would be prohibitive. In practice, the largest aerospace composite structural component is the 14 foot diameter graphite/epoxy solid rocket motor case manufactured by Hercules Aerospace, Inc. Fabrication of this structure was conducted in an oven with pressure being applied using shrink tape and a vacuum (14 psi). The resulting structure was porous and of a significantly lower strength, in the order of approximately fifteen to thirty percent strength reduction, than that estimated to be attainable with the application of greater pressures in the order of approximately 85 psi.

Studies conducted by the U.S. Air Force of graphite/epoxy composites process in autoclaves under 85 psi pressure versus non-autoclave cure cycles under pressures of approximately 15 psi typically show a fifteen to forty five percent strength reduction and porosity/delaminations in structures. Additional material is usually added to improve the situation by increasing the resin content to allow better flow, which reduces the strength-to-density ratio, and by adding more material to achieve required performance. Both of these solutions, however, increase both the cost and the weight of these structures.

Additionally, when using autoclave curing of composite materials when the pressure is applied to thick laminate disposed around the mandrel, the external pressure reduces the bulk factor and makes the composite structure thinner and more dense. The outer plies, having a fixed circumference, are suddenly too long and distort or buckle as they are compressed and forced to reposition into a smaller volume. Such distortion results in flaws which are detrimental to the structure.

Recent studies on boost vehicles, e.g., the NSTS External Tank, the Advanced Launch System and the Titan II, indicate significant weight savings may be achieved by using resin-matrix advanced composite such as graphite/epoxy for the intertank structure. However, the technology of fabricating a structure of this size has yet to be developed. In addition, the design, fabrication and cost of an autoclave required to ensure producability for a filament wound or cocured structure would make non-recurring production costs prohibitively high.

Metal-matrix composite fabrication presents further complications. In general, two types of starting material are available to make either monolayer tape or multilayer sheet, plate and structural shapes, these being filaments and metal or a previously prepared tape. There are four basic forms of tape (1) filaments bonded to foil sheets with a polymeric binder, e.g., acrylic or polystyrene, known as green tape; (2) filaments bonded to foil by an overlay of plasma sprayed matrix metal, known as plasma sprayed tape; (3) filaments sandwiched between two sheets of metal that have been diffusion bonded together, known as diffusion bonded tape; and (4) reinforced filaments and matrix metal wire woven together, known as woven tapes. Sheet, plate or structural shapes are then formed by these materials by diffusion bonding, braze bonding or eutectic bonding. Although low pressure processes of less than 200 psi have been pioneered using braze bonding and eutectic bonding, material properties are not comparable to those obtained by high pressure diffusion bonding. High pressure diffusion bonding is the most developed process having been applied to various space shuttle structures. This process is performed in an autoclave or in a press at pressures between 3000 and 10,000 psi, and temperatures of 850° F. to 1000° F. Hot presses are generally limited to the production of flat panels either having constant or varying cross section, and autoclaves are required for fabrication of structural shapes such as tubes, hats, tees, and similar shaped structures. Thus, lack of fabrication ease limits the wide spread application of these metalmatrix materials and their benefits have not been realized to the full extent.

SUMMARY OF THE INVENTION

Consequently, it is a primary object of the present invention to provide a low cost process for fabricating high quality laminated components.

It is another object of the present invention to provide a process for fabricating structures from high strength low weight composite materials by applying pressure internally while maintaining a pressure restraint on the exterior of the structure so that the reinforcing fibers are under tension.

It is a further object of the present invention to provide a method for fabricating large diameter structures from high strength low weight composite laminated materials under high pressure so that automated fabrications can be obtained, and so as to increase the mechanical properties of the structures relative to the prior art.

Accordingly, the present invention provides a method for fabricating structures composed of composite materials by sandwiching the composite structure between a material having a high coefficient of thermal expansion (hereinafter C.T.E.) and a stiff material having a low C.T.E., the material with the high C.T.E. being disposed on a mandrel and the low C.T.E. material being disposed on the composite as an overwrap remote from the mandrel, and thereafter heating the entire structural system so that the differential in thermal expansion of the sandwiching materials creates a pressure differential which acts to compress the composite structure. More specifically, a cylindrical composite structure may be disposed about a high C.T.E. material positioned on a mandrel so that pressure is applied internally to the composite material upon application of heat to the system comprising the sandwiched structure. The low C.T.E. material preferably is a graphite fiber overwrap which is stiffer than the composite, and is tightly disposed about the exterior of the composite structure, and when the high C.T.E. material expands force is applied to the composite structure under the external pressure constraint of the graphite overwrap.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
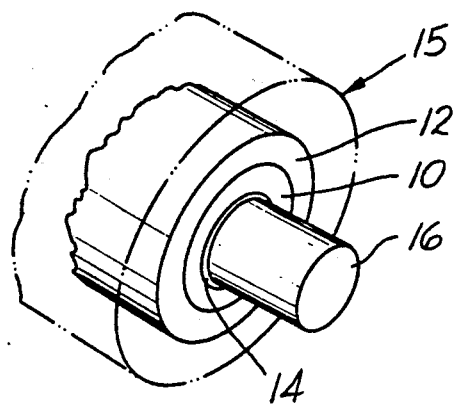
FIG. 1 is a fragmentary perspective view of the application of the method of the present invention as applied to a cylindrical composite structure, with an external heat source illustrated diagrammatically in phantom.

Referring now to the drawings, FIG. 1 illustrates an overview of the method of the present invention, the method utilizing the thermal performance of materials at elevated temperatures to exert a pressure against a composite structure 10 having high strength, high stiffness fibers in a low density non-metallic or metallic matrix. For example, the composite structure 10 may be a resin matrix composite such as graphite/epoxy or a metal matrix composite, i.e., filament and metal or a prepared tape formed from filaments and foil, sheets or wire. The materials of the composite must be bonded together and cured to form the composite structure, and as aforesaid in the case of structural shapes this has been conducted, at least for relatively small structures, in an autoclave, large composite structures only being fabricated in ovens and thus have not been able to fully utilize the advantages of such composite materials. In the case of flat panels, the composite can be diffusion bonded in a press under high temperature and pressure. The present invention permits the fabrication of structural shapes without the need for expensive autoclaves by pressurizing the composite material 10 in an assembly between a low C.T.E. outer material or over-wrap 12 and a high C.T.E. inner material 14. Upon application of a heat source, generally indicated at 15, to the sandwich or assembly comprising the composite, the outer material 12 and the inner material 14, the expansion of the inner material and the restraint of the outer material results in a pressure differential acting against the composite material 10. The resulting high pressure and temperature achieves good laminate compaction and curing which is representative of autoclave and diffusion bonding.

In the preferred form of the pressurizing system, the over-wrap comprises high strength graphite fibers which have a relatively low C.T.E., e.g., approximately $0.6 \times 10^6$ inch/degree F and an ultimate strength of approximately 500 Kpsi as compared to aluminum with a C.T.E. of approximately $13 \times 10^6$ and an ultimate strength of approximately 65 Kpsi, and stainless steel of a C.T.E. of approximately $10 \times 10^6$ and an ultimate strength of approximately 80 Kpsi. One such graphite fiber having these properties is AS4 produced by Hercules Aerospace, Inc. A high strength fiber such as graphite is required for withstanding the load of the expanding material due to the pressure differential of the expansion. Since the pressure is limited by the capability of the material to carry the load, the thickness of the graphite overwrap can be increased to increase the load carrying capability.

Figure 2:
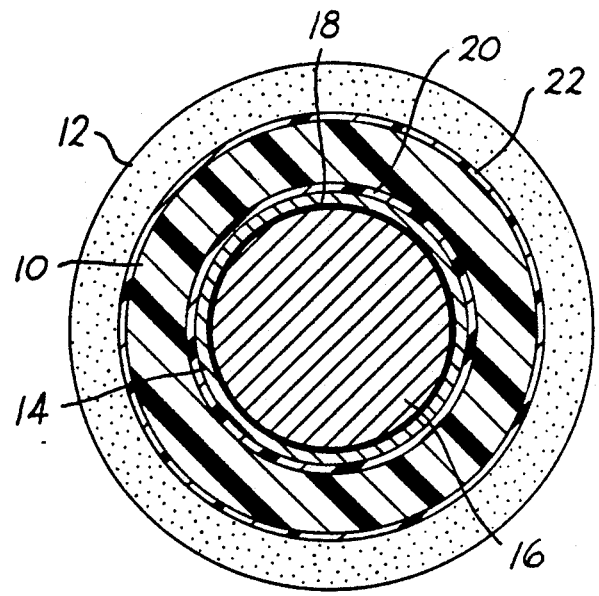
FIG. 2 is a cross sectional view taken through the assembly of FIG. 1.

The inner-wrap or high C.T.E. material 14 is disposed about a mandrel 16 of the desired shape of the composite structure 10 to be fabricated. The inner-wrap 14 preferably is aluminum or stainless steel, and the mandrel may be formed from a conventional material such as steel. To aid in disassembling the assembly after the curing process, a release system permitting the separating of the inner-wrap 14 from the mandrel, the composite material 10 from the inner-wrap, and the over-wrap from the composite material separates these respective subassemblies. Such releasing plies may be formed from polytetrafluorethylen sold under the registers trademark TEFLON or similar low friction material and is illustrated in FIG. 2 at 18, 20 and 22.

Figure 3:
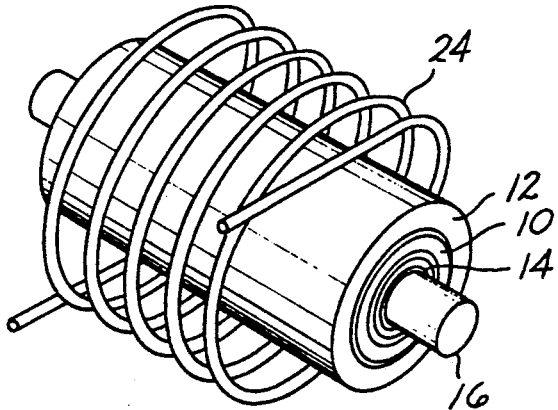
FIG. 3 is a perspective view similar to FIG. 1 wherein an electrical heating coil is disposed about the assembly of FIG. 2.
Figure 4:
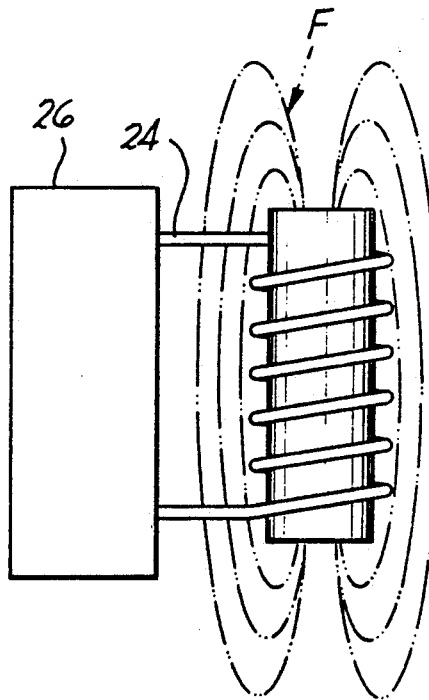
FIG. 4 is a schematic view illustrating the heating system for the assembly illustrated in FIG. 3.

The graphite filament is tightly wound about the inner assembly comprising the release materials, the composite material, the metallic inner-wrap 14 and the mandrel, and heated either in an oven, or in the case of large structures, by apparatus such as illustrated in FIGS. 3 and 4. Any source of heat sufficient to expand the metal inner-wrap and supply a sufficient pressure on the composite material would suffice. Therefore placing the structure in an oven would normally be sufficient, but in applications where there is insufficient size for heating the structure, apparatus such as that illustrated in FIG. 4 may be utilized. This apparatus utilizes the principles of Faraday's Law by generating magnetic force fields by a current flowing through an electrical conductor 24. The magnetic field F generated when an alternating current source 26 is utilized induces secondary currents in the graphite overwrap laminations and when the electrical coil 24, which can be graphite, is in close proximity, but not in contact with the overwrap, eddy currents are produced to create an induction heating of the assembly. Since graphite is a conductor, eddy currents can be produced therein to intensify the heat which is conducted to the composite part. Rather than electrical coils disposed about the graphite overwrap, a metallic overwrap disposed over the graphite may be utilized. The heating up and temperature rise of the assembly may be controlled by the number of wire revolutions and the magnitude of the current applied by the source 26. For thick parts, the mandrel 16 may be heated internally by either utilizing a double mandrel system or a heating coil within a hollow mandrel.

A typical cure cycle requires a temperature rise of approximately 350° F. In a cylindrical system such as illustrated, the circumference of the inner and outer wraps would increase by an amount equal to $\pi a(\Delta T)\alpha$ wherein $a$ is the outer diameter of the inner-wrap or the inner diameter of the outer-wrap; $\Delta T$ is the temperature rise; and $\alpha$ is the coefficient of linear expansion of the material. Thus, the interference between the radii can be determined from the difference in the circumferential expansions of the inner and outer-wraps. Because graphite for all practical purposes does not change with temperature, component configuration control may be tied to the graphite/composite interface. The substantially greater expansion of the inner-wrap 14 thus results in an interference between the radii of the inner and outer-wrap 12 resulting in an interfacial pressure due to the contact of the components. The change of radius due to a uniform radial pressure, without longitudinal forces, is equal to $pr^2/Eh$ wherein p is the pressure, r is the respective radius, E is the Elastic Modulus, and h is the thickness of the respective wrap. Accordingly, from the change in radii and the resulting interference, the pressure can be determined, and compared to the tangential stresses in the two shells, tangential stress being equal pr/h to determine the stress levels in the inner and outer-wrap and to determine or verify the minimum thickness and material properties of the wraps. The pressure may be modified by increasing or decreasing the thickness of the inner-wrap as necessary for the composite material. A graphite/epoxy composite obviously can withstand a smaller pressure than a metal matrix composite, and in the latter case greater pressures would be required for the bonding and curing process.

As aforesaid an aluminum alloy or a stainless steel material may be used for the inner-wrap, stainless steel being more versatile since it is reusable. For a graphite/epoxy composite part having a thickness of 0.25 inches and a 20 inch diameter, it is expected that using a 0.25 inch thick graphite fiber outer-wrap and a 0.02 inch thick stainless steel inner-wrap, a pressure of 100 psi can be obtained at 350° F. For a graphite/aluminum composite part of the same size, with a 0.25 inch graphite outerwrap and a 0.31 thick stainless steel inner-wrap a 5000 psi pressure can be obtained at 1000° F. In all of the aforesaid calculations, the mandrel material was not considered, but should be considered when designing an assembly utilizing the present method.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus described the nature of the invention, what is claimed herein is:

1. A method of fabricating a structural member from a composite body comprising a laminated matrix material containing high strength reinforcing fibers, said method comprising positioning said body in an assembly between and abutting an inner form having an outer surface conforming to an inner surface of said body and a stiff outer form having an inner surface conforming to an outer surface of said body, said inner form comprising a material having a relatively high coefficient of thermal expansion, said outer form comprising an overwrap of graphite fibers, and heating said assembly so that said inner form expands to forcibly compress said body against said outer form, and said body is thereby bonded by application of heat and pressure.

2. The method as recited in claim 1, including positioning said inner form about a mandrel.

3. The method as recited in claim 2, wherein said heating comprises disposing electrical conductors about said outer form and applying electricity thereto to generate magnetic force fields to induce heat into said assembly.

4. The method as recited in claim 1, wherein said positioning the said body in said assembly includes disposing said body about a metal alloy forming said inner form.

5. The method of fabricating an annular body member from a composite material comprising laminated matrix material containing high-strength fibers and having an inner wall surface and an outer wall surface, said method comprising forming said material into an annular workpiece, positioning said workpiece between an inner form comprising a material having a relatively high coefficient of thermal expansion, said inner form having an outer surface conforming to an inner surface of said workpiece, and a tightly wrapped outer form comprising overwrapped graphite fibers and heating the assembled workpiece and forms whereby thermal expansion of said inner form compresses said workpiece against said outer form, and said body member is bonded by application of heat and pressure.

6. In the method of constructing a structural element having an annular wall from a high strength low weight composite material requiring bonding and curing of said material at high pressure and temperature, the improvement comprising disposing a material having a high coefficient of thermal expansion about a mandrel having an outer surface conforming to an internal surface of said wall, positioning said composite material about the high coefficient of thermal expansion material, wrapping laminations of graphite fibers about the exterior of said composite material, and heating said high coefficient of thermal expansion material so that it expands and applies a force against said composite material, said laminations being of sufficient thickness to substantially preclude movement of said composite material outwardly, whereby said composite material is compressed between said high coefficient of thermal expansion material and said laminations and said composite material is 7. The improvement as defined in claim 6, wherein said composite material comprises an epoxy resin matrix containing graphite fibers.

8. The improvement as defined in claim 7, including placing a layer of a release agent between said mandrel and said material having a high thermal conductivity and on inside and outside surfaces of said annular wall.

* * * * *